United States Patent

Dawson

[15] 3,680,640
[45] Aug. 1, 1972

[54] GARDEN TRACTOR

[72] Inventor: Elmer C. Dawson, 402 E. Willow St., Scottsboro, Ala. 35768

[22] Filed: Nov. 24, 1970

[21] Appl. No.: 92,346

[52] U.S. Cl. ..............................172/258, 172/292
[51] Int. Cl. .....................................A01b 69/258
[58] Field of Search........172/256, 258, 42, 329, 351; 180/19

[56] References Cited

UNITED STATES PATENTS

| | | | |
|---|---|---|---|
| 1,497,695 | 6/1924 | Nobbs | 172/258 |
| 1,553,919 | 9/1925 | Smith | 172/258 |
| 2,529,369 | 11/1950 | Beachy | 172/258 |
| 2,961,055 | 11/1960 | Marlow | 172/256 X |

FOREIGN PATENTS OR APPLICATIONS

| | | | |
|---|---|---|---|
| 478,616 | 8/1948 | Canada | 172/256 |
| 948,099 | 8/1956 | Germany | 172/258 |

*Primary Examiner*—Robert E. Pulfrey
*Assistant Examiner*—Stephen C. Pellegrino
*Attorney*—Mason, Mason & Albright

[57] ABSTRACT

A lightweight garden tractor having a relatively large single traction wheel connected through four depending braces to a pair of diverging bars which terminate in handles. A Y-shaped plow foot connected to each of the bars extends downwardly to immediately behind the lower portion of the wheel, and a horizontal forked member which is pivoted to the depending braces connects with the plow foot and, intermediate the plow foot and depending braces, includes an upstanding support member which, with the upper portion of the plow foot, carries a platform upon which the motive power, an internal gasoline motor, is supported. The weight of the gasoline motor is disposed almost directly over the tool carrying portion of the plow foot and a direct metal linkage with the plow foot exists through same and also through the upstanding support member and the forked member. Motive power is supplied to the traction wheel by means of a drive sprocket affixed thereto which is driven by a chain from a further small sprocket on the same shaft with a large pulley which in turn is driven by a belt from a small pulley connected to the motor's shaft, there being a control member for effecting engagement of the belt for propeling the implement which is secured near one of the handles on the diverging bars. The operator's view of the tool carrying portion of the plow foot and of the traction wheel where it contacts the ground is substantially unimpaired by the other parts of the tractor.

8 Claims, 2 Drawing Figures

INVENTOR
ELMER C. DAWSON

GARDEN TRACTOR

BACKGROUND OF THE INVENTION

In plowing with a garden tractor, the best result may be obtained when the operator is cognizant at all times of the terrain immediately ahead of the traction wheel of the tractor and the terrain immediately ahead of the plow itself or other tool being utilized by the garden tractor. Garden tractors which have a single wheel or two parallel wheels generally receive their motive power from an internal combustion gasoline engine which is disposed over the axle of the wheel or wheels in order to obtain a balanced machine which is manually manuverable. However, when the engine is so located, frequently it tends to impair the operator's view of the terrain immediately ahead of the tractor's wheel and, of course, places the weight of the engine directly on the wheel rather than the cultivating tool. In designing a lightweight garden tractor, it occurred to the inventor that the motor might more advantageously be located rearwardly of the main traction wheel in a lightweight garden tractor having a single traction wheel and that this would improve the operator's field of view immediately ahead of the traction wheel and of the tool being utilized on the garden tractor. By means of the novel arrangement as disclosed hereafter, a lightweight garden tractor is provided with an improved field of vision for the operator and, in addition, with other advantages over existing and known garden tractors.

SUMMARY OF THE INVENTION

The invention relates to the garden tractor which is lightweight, compact and gives the operator a largely unobstructed view of the row being cultivated. It also, centers the weight of the internal combustion engine which powers the tractor over the tool being utilized for cultivating purposes whereby the mass of the garden tractor is arranged so that there is less tendency for the tool to be diverted by obstructions in the soil or by lateral movements by the implement's traction wheel. Still further, the internal combustion engine is linked to the tool by a direct weight bearing metal to metal linkage so that vibrations of the internal combustion engine are received directly in the cultivating tool. This vibration tends to assist the tool in traversing the earth in its cultivating operation.

The above advantages are obtained by having a relatively large traction wheel with a drive sprocket affixed thereto. Diverging bars connect via affixed depending members at their forward end to the traction wheel and at the rear provide handles for the operator. A plow foot is provided about midway along the diverging bars so as to place the cultivating tool immediately behind the traction wheel. The plow foot, together with a fork member which pivots from the axle and attaches to the plow foot support the internal combustion engine via, in part, an upstanding metal supporting member which is connected to the pivoted forked member. Accordingly, the implement's center of gravity is directly under the internal combustion engine and also, for the device as a whole, is located in a vertical plane transverse to the implement's direction of travel which is rearward of the traction wheel and at or slightly forward of the cultivating tool. The result is a lightweight implement with row visibility superior to known existing and prior art models. Moreover, the design lends itself to adjustability so that the plow foot may be adjusted forward and back for proper depth and the handles raised or lowered for the height desired by the operator. The motor may be conveniently started and controlled from the operator's position.

Other objects, adaptabilities and capabilities will appear as the description progresses, reference being had to the accompanying drawings, in which:

DESCRIPTION OF THE PREFERRED EMBODIMENT

Figure 1:
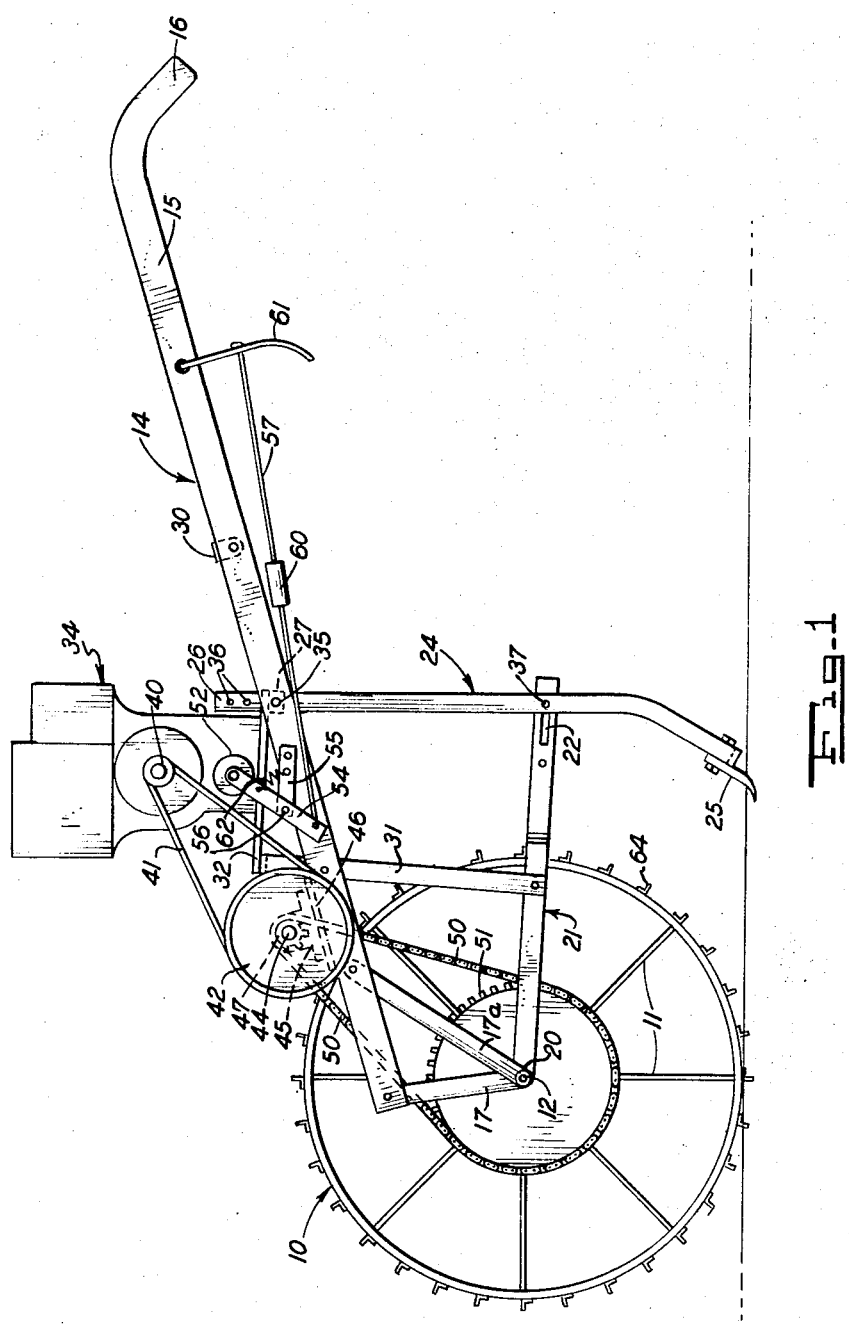
FIG. 1 is a side view of a garden tractor embodying the features of the invention.

Referring now to FIG. 1, a single steel traction wheel 10 is supported by spokes 11 which extend from a hub containing an axle 12. A frame designated generally 14 comprises diverging bars 15, preferably composed of wood, which terminate rearwardly in handles 16. At the forward end of bars 15, frame 14 includes depending members 17 which include depending member braces 17a, the depending members 17 and depending member braces 17a, having bushings or bearings 20 journaled therein or other appropriate means to receive axle 12. It will be appreciated that the bar 15, together with the depending members 17 and 17a, form a rigid structure.

Figure 2:
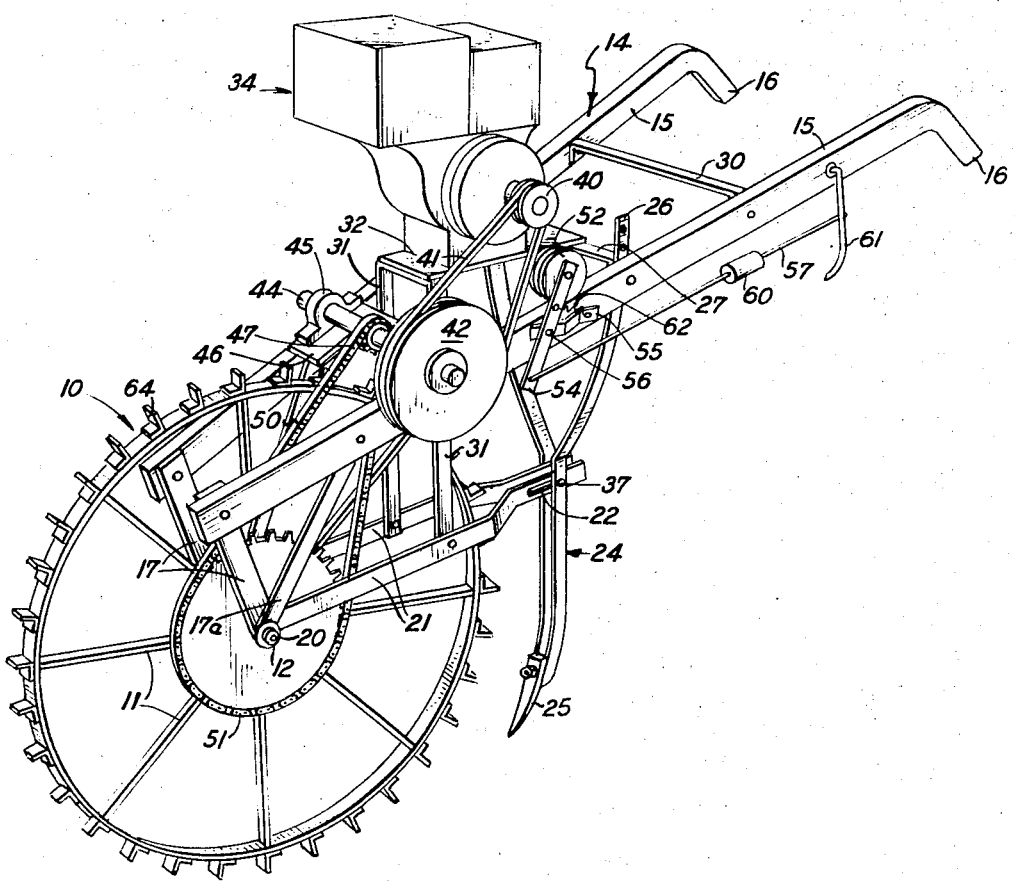
FIG. 2 is a perspective view of the garden tractor shown in FIG. 1.

A horizontal fork member 21 is pivoted on its forward end to axle 12 and receives in a horizontal slot 22, a Y-shaped plow foot 24 which has connected thereto at its lower extremity a cultivating tool 25 and is connected on each branch of its upper portions 26 to each of the bars 15. A support bar 27 is connected between the upper branches 26 of plow foot 24. The further connection between the bars 15 is a spreader brace 30 which, with the support bar 27, assists in maintaining the bars 15 in their desired diverging position as seen in FIG. 2.

An upstanding support member 31 which has the shape of an inverted U extends upwardly from the midpoint of the fork member 21 between bars 15 to where it receives and is connected to the forward end of the motor platform 32 which is supported by, and connected to on its after end, the support bar 27.

An internal combustion engine 34 is supported by and affixed to the motor platform 32 and it will be appreciated that the weight of engine 34 is carried on the after end by the support bar 27 and on the forward end by the support member 31, the horizontal forked member 21, plow foot 24 and finally cultivating tool 25. Thus, in operation, the weight of the internal combustion engine 34 and of the garden tractor as a whole is born largely by the cultivating tool 25 and to a somewhat lesser extent by the traction wheel 10. The internal combustion engine 34 can be adjusted within limits on the motor platform 34 which has longitudinally extending slots for receiving the bolts (not shown) which tie down the motor 34. This adjusts, in turn, within limits the center of gravity of the garden tractor and the disposition of its weight on the cultivating tool 25 vis-a-vis the traction wheel 10. Adjustment is also possible by the operator by lifting or putting weight on handles 16.

The inclination of bars 15 or the amount of extension of the plow foot 24 or both, can be adjusted by the securing of the bolts 35 in one of the selected appertures 36 which are contained in each of the branches 26 of the plow foot 24. The fore and aft disposition of the plow foot 24 and accordingly, of the attached cultivating tool 25, can be adjusted within limits by securing the bolt 37 as desired along slot 22. This also permits adjustment, within limits, of the quantity of downward force due to the weight of the internal combustion engine 34 and the other parts of the garden tractor on the cultivating tool 25.

A small pulley 40 extends from the motor drive shaft of engine 34 and receives an endless belt 41 which is received on the other end by a large pulley 42 affixed to a shaft 44, which is received in bearings journaled in a bushing of pillow block 45. A pillow block 45 is mounted on each bar 15 via a plate 46 which extends across the bars 15 to assist further in retaining them in the desired diverging position. Shaft 44 has affixed thereto between the pillow block 45 a small sprocket 47 which receives an endless link chain 50 which, in turn, is received on its other end about a large drive sprocket 51 affixed to traction wheel 10 for driving same.

A belt tightener pulley 52 is carried by a lever 54 so that it can engage and disengage drive belt 41. Lever 54 is pivotly connected to a bar 15, as seen in FIG. 1, by means of a bracket 55 and pivot pin 56. A rod 57, including a knuckle 60 for adjusting its length, is connected on its forward end to the lower end of the lever 54 and rearwardly to a control lever 61 which is pivotly connected to bar 15. A tension spring 62 connected between the upper portion of lever 54 and to bracket 55 urges the belt tightening pulley 52 downwardly and to the rear as seen in FIG. 1. By moving control lever 61 to the rear as seen in FIG. 1, the belt tightening pulley 52 is moved by lever 54 against the drive belt 41 whereby power from pulley 40 is transmitted to the drive pulley 42 causing it to rotate and, accordingly, via shaft 44 and sprocket 47, causing traction wheel 10 to rotate.

The revolutions per minute of the small pulley 40 under normal operating conditions are such that the garden tractor is a slow moving implement. The garden tractor is light in weight, relatively small in size and, as previously indicated, permits unusually good visibility of the cultivating tool 25 and the traction wheel 10 as it moves along a row. Traction wheel 10 is relatively large, about 25 inches in diameter, and is one inch wide. It is provided with cleats 64 in order to improve its traction. The frame 14 is tapered from the axle 12 which is about three and one-half inches wide to a width of 24 inches between handles 16 which is the operator's position. The normal height of the implement at the operator's position is 34 inches and the overall length is about 64 inches. The preferred internal combustion engine 34 is a three horsepower Briggs and Stratton air-cooled type gasoline engine which, as shown and described, is disposed over the cultivating tool 25. Vibration of the internal combustion engine 34 communicates itself directly to cultivating tool 25 via the plow foot 24, and the support member 31 and fork member 21. Such vibration tends to assist the transit of the cultivating tool 25 through the ground. The weight transmitted by the internal combustion engine 34 on the cultivating tool 25 further tends to retain the cultivating tool 25 at a uniform desired depth below the surface of the ground being cultivated.

Having thus described my invention, what I claim as new and desire to secure by Letters of Patent of the United States is:

1. A garden tractor which comprises a frame, said frame including a pair of bars terminating rearwardly in handle means and having at their forward ends depending members rigidly affixed thereto, a relatively large traction wheel including an axle, said axle being rotatably received by bearings journalled in the lower aspects of said depending member, a Y-shaped plow foot connected by an upper branch thereof to each of said bars and extending downwardly to immediately behind the lower portion of said wheel, a horizontal fork member included in said frame connecting said plow foot to said axle on both sides of said wheel, a support member connected to said fork member and extending upwardly between said bars, a motor platform connected to said support member and said plow foot above said fork member, said support member providing support for said platform on at least one end, an internal combustion engine operatably connected to said traction wheel carried by said platform whereby the weight of said motor disposed directly above the lower end of said plow foot.

2. A garden tractor in accordance with claim 1 wherein said platform is adjacent to and between said bars.

3. A garden tractor in accordance with claim 2 wherein said plow foot is connected in its upper aspect to said bars whereby the view by an operator of the tractor of said wheel where it contacts the ground and lower portion of said plow foot is substantially unimpaired by other parts of the tractor.

4. A garden tractor in accordance with claim 1 wherein a drive sprocket is rigidly connected to said wheel and located between said wheel and one of said depending members and drive means is provided which operatively links said engine with said drive sprocket.

5. A garden tractor in accordance with claim 1 wherein cleats are connected to the perphery of said wheel and extend outwardly therefrom.

6. A garden tractor which comprises a frame, said frame including a pair of bars terminating rearwardly in handle means and forwardly in depending means, a relatively large traction wheel including an axle connected to said depending means, a Y-shaped plow foot connected to each of said bars and extending downwardly therefrom to immediately behind the lower portion of said wheel, a horizontal fork member pivotly connected at its forward portions to said depending member and rearwardly connected to said plow foot, a support member connected to said fork member between its connections to said depending member and said plow foot, said support member extending upwardly substantially parallel to said plow foot, a horizontal motor platform connected to said support member and said plow foot above said fork member, said support member supporting said platform on at least one end and transmitting the weight of said platform to said fork member, an internal combustion engine operatively connected to said tractor wheel and carried by said platform whereby the weight of said motor disposed substantially above the tool receiving end of said plow foot.

7. A garden tractor in accordance with claim 6 wherein the vibration of said motor transmitted to the tool receiving end of said plow foot via said plow foot, and said support member and fork member.

8. A garden tractor in accordance with claim 6 wherein said plow foot is connected in its upper aspect to said bars whereby the view by an operator of the tractor of said wheel where it contacts the ground and the tool receiving end of said plow foot is substantially unimpaired by the other parts of the tractor.

* * * * *